(12) United States Patent
Palmer

(10) Patent No.: US 12,050,804 B2
(45) Date of Patent: *Jul. 30, 2024

(54) VALID DATA AWARE MEDIA RELIABILITY SCANNING

(71) Applicant: Micron Technology, Inc., Boise, ID (US)

(72) Inventor: David Aaron Palmer, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/942,821

(22) Filed: Sep. 12, 2022

(65) Prior Publication Data

US 2023/0070538 A1 Mar. 9, 2023

Related U.S. Application Data

(63) Continuation of application No. 17/153,068, filed on Jan. 20, 2021, now Pat. No. 11,467,763.

(51) Int. Cl.
*G06F 3/06* (2006.01)
*G06F 12/10* (2016.01)

(52) U.S. Cl.
CPC .......... *G06F 3/0653* (2013.01); *G06F 3/0619* (2013.01); *G06F 3/064* (2013.01); *G06F 3/0679* (2013.01); *G06F 12/10* (2013.01); *G06F 2212/657* (2013.01)

(58) Field of Classification Search
CPC .................................................. G06F 3/0653
USPC ........................................................ 711/103
See application file for complete search history.

(56) References Cited

U.S. PATENT DOCUMENTS

| | | | |
|---|---|---|---|
| 7,038,932 B1 | 5/2006 | Eliason | |
| 9,858,002 B1 | 1/2018 | Goss et al. | |
| 2015/0212883 A1* | 7/2015 | Chen | G11C 29/028 714/764 |
| 2015/0370727 A1* | 12/2015 | Hashimoto | G06F 21/64 711/163 |
| 2016/0118111 A1* | 4/2016 | Hyun | G11C 16/16 365/185.03 |
| 2016/0124668 A1* | 5/2016 | Inbar | G06F 3/065 711/162 |
| 2018/0285258 A1* | 10/2018 | Muchherla | G06F 12/0246 |
| 2019/0146704 A1* | 5/2019 | Lin | G06F 3/0659 711/103 |
| 2020/0152280 A1 | 5/2020 | Muchherla et al. | |

(Continued)

*Primary Examiner* — Titus Wong
(74) *Attorney, Agent, or Firm* — Holland & Hart LLP

(57) ABSTRACT

Methods, systems, and devices for valid data aware media reliability scanning are described. An apparatus may include a memory array comprising a plurality of blocks and a controller coupled with the memory array. The controller may be configured to select a block of the plurality of blocks for a scan operation to determine a margin of reliability for a first set of data stored in the block. The controller may identify information associated with a status of a validity of sub-blocks of the first set of data in the block. The controller may determine a first subset of the sub-blocks storing valid data of the first set of data and a second subset of sub-blocks that are invalid based on identifying the information. The controller may perform the scan operation on the first subset of sub-blocks and not on the second subset of sub-blocks in the block.

20 Claims, 7 Drawing Sheets

(56) References Cited

U.S. PATENT DOCUMENTS

2020/0174681 A1 6/2020 Malshe et al.
2020/0211664 A1 7/2020 Vashi et al.
2020/0387324 A1 12/2020 Muchherla et al.

* cited by examiner

VALID DATA AWARE MEDIA RELIABILITY SCANNING

CROSS REFERENCE

The present application for patent is a continuation of U.S. patent application Ser. No. 17/153,068 by Palmer, entitled "VALID DATA AWARE MEDIA RELIABILITY SCANNING," filed Jan. 20, 2021, assigned to the assignee hereof, and is expressly incorporated by reference in its entirety herein.

FIELD OF TECHNOLOGY

The following relates generally to one or more systems for memory and more specifically to valid data aware media reliability scanning.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
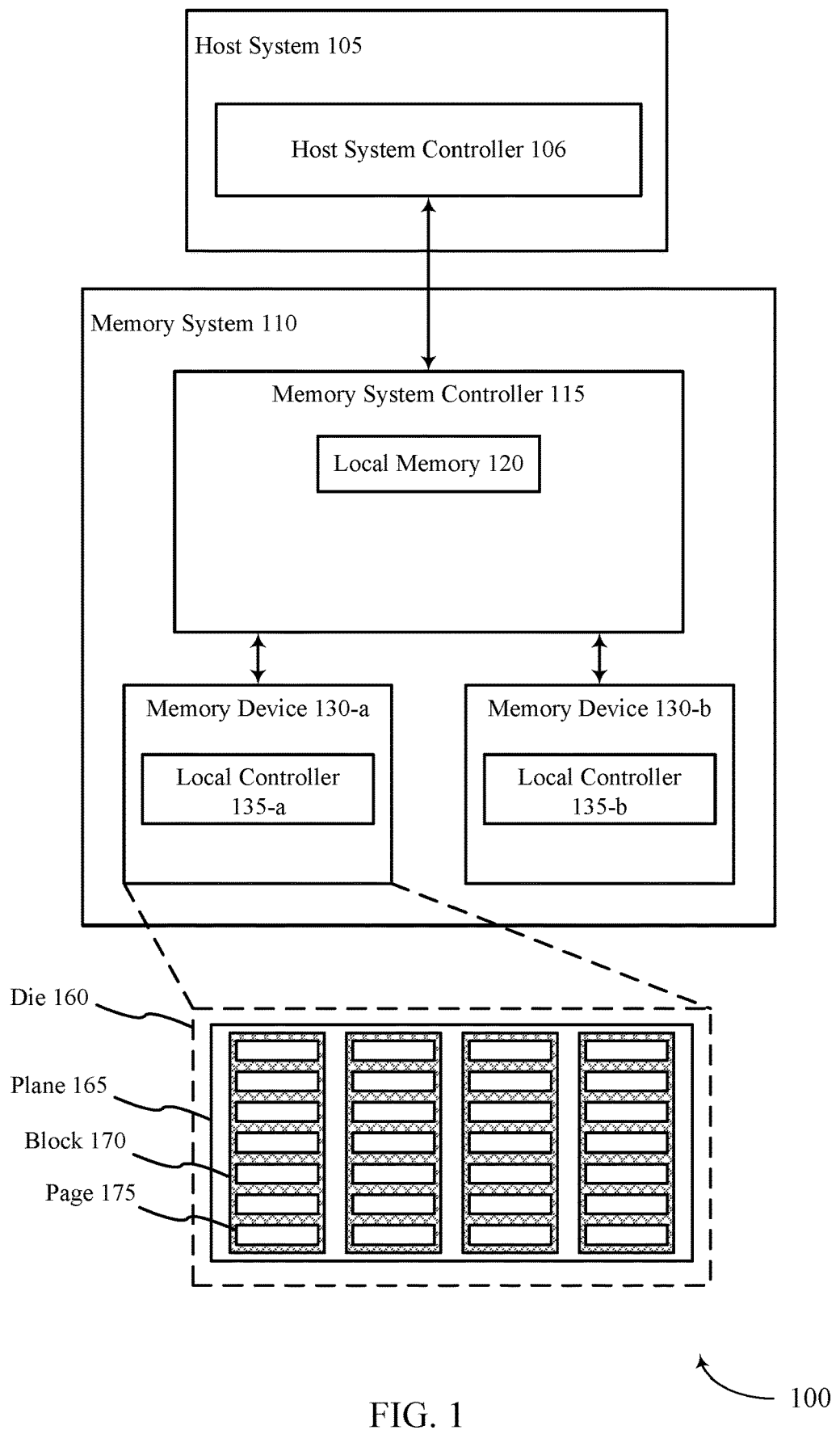
FIG. 1 illustrates an example of a system that supports valid data aware media reliability scanning in accordance with examples as disclosed herein.

A system may include a host system and a memory system that stores data for the host system. For example, the memory system may include NAND memory cells that store a logic state. Memory systems may be manufactured smaller and smaller to reduce the size the memory system takes in the system—e.g., to meet market demands. For example, NAND media continues to grow in technological complexity and reduce in size. As the memory systems get smaller and smaller, there may be increasing pressure on intrinsic data storage reliability. In some cases, as the memory cells are reduced in size, a voltage utilized to program a first logic state may be close in magnitude to a second voltage utilized to program a second logic state—e.g., a memory cell may be more likely to drift from a desired logic state to an undesired logic state and thus reduce the reliability of data storage in the memory system. A common approach to reduce reliability issues is to periodically scan the data stored in the memory system to evaluate the quality of the programmed cell distributions to ensure there is margin to meeting reliability specifications—e.g., scanning may be used to determine if the data stored is reliable and not likely to be altered due to temperature, time, charge loss, charge gain, and other disturbance mechanisms. For example, a memory system controller may periodically scan NAND media to look for errors or margin of programmed states. In some examples, the scans utilize significant NAND input/output (I/O) traffic—e.g., to read and analyze distributions on a significant fraction of blocks and pages of the NAND device. In such examples, the traffic utilized for the scan may compete with host traffic for overall bandwidth and lead to host-perceived device performance degradation—e.g., as memory systems get smaller, they may utilize more scans to ensure the reliability of the data stored, but an increased quantity of scans may cause a reduction in performance of the memory system as more resources are allocated to performing the scans.

Systems, techniques, and devices are described herein for a memory system to perform reliability scans using information related to validity of data within blocks to determine which pages of the memory system on which to perform the scan operations. Specifically, the scan operation may skip pages within a block that do not include valid data. The memory system may use validity information that is otherwise maintained for garbage collection. That is, the memory system may utilize the information kept for garbage collection operations in NAND memory to also perform more efficient scans that refrain from scanning invalid data. The memory system may be capable of utilizing various techniques to keep track of valid and invalid data. For example, a first technique may include using a page validity table (PVT) that may be maintained for garbage collection. The PVT may be a bitmap that includes a bit for each page within each block. In some examples, a second technique may include using a physical-to-logical (P2L) map, which stores the logical block address (LBA) written to each location.

Because the P2L map is not typically updated when data is rewritten, a lookup operation for the LBAs in the P2L may be conducted using the logical-to-physical (L2P) table to determine if the valid version of the LBA is the one listed for the block. In some cases, a third technique may include using a L2P bitmap which would be stored in addition to the L2P table and identify which regions of the L2P table include entries into the block. Those regions can then be read to determine the valid pages of the block. In other examples, the memory system may utilize a different technique to keep track of invalid and valid data. By utilizing the information that is otherwise maintained for garbage collection, the memory system may increase the efficiency of the scan operations—e.g., by knowing which pages include invalid data, the scan operations may skip pages storing invalid data and scan the pages that contain valid data, speeding up the scanning operations and reducing the bandwidth of the traffic utilized for the scan operations.

Features of the disclosure are initially described in the context of systems, devices, and circuits as described with reference to FIGS. 1 through 2. Features of the disclosure are described in the context of distribution plots, systems, and process flows as described with reference to FIGS. 3-5. These and other features of the disclosure are further illustrated by and described with reference to an apparatus diagram and flowcharts that relate to valid data aware media reliability scanning as described with reference to FIGS. 6 and 7.

FIG. 1 illustrates an example of a system 100 that supports valid data aware media reliability scanning in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130 a may include a local controller 135 a and a memory device 130 b may include a local controller 135 b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, folding (e.g., moving data to different levels of pages, for example SLC data to MLC data), health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support valid data aware media reliability scanning. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some examples, the memory system controller 115 may also perform scan operations to determine a margin of reliability of data stored in the memory devices 130. That is, data stored in the memory devices 130 may be altered due to time, temperature changes, charge loss, charge gain, and other disturb mechanisms. To ensure the data is reliably stored, the memory system controller 115 may perform periodic scan operations to check for margin of stored data or fix errors that occur. In some examples, the scan operations may be performed in the background as the memory system 110 also performs an operation for the host system 105. That is, the traffic from the scan operation may compete with the traffic from the host system operations, causing the system 100 to use more bandwidth and experience a reduction in overall performance.

As described herein, the memory system controller 115 may perform the scan operation utilizing the information otherwise used for garbage collection—e.g., a validity of the data stored in the memory devices 130. In such examples, the memory system controller 115 may more efficiently scan the data as invalid data may not be scanned. Refraining from scanning the invalid data may decrease a duration to perform the scan operation, allowing the system 100 to reduce bandwidth and increase the overall performance. The memory system controller 115 may utilize various techniques to maintain the validity information as described with reference to FIG. 4.

Figure 2:
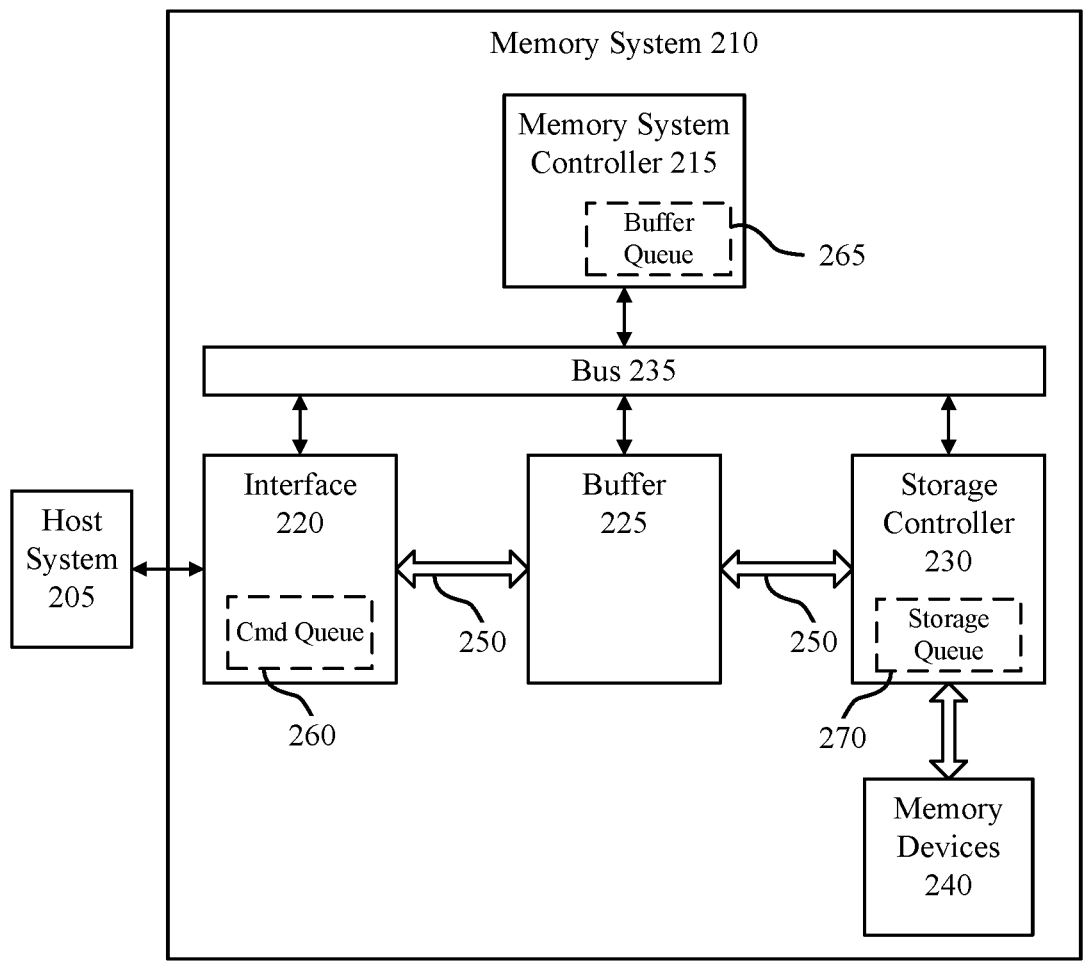
FIG. 2 illustrates an example of a system that supports valid data aware media reliability scanning in accordance with examples as disclosed herein.

FIG. 2 illustrates an example of a system 200 that supports valid data aware media reliability scanning in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some examples, the memory system controller 215 may also perform scan operations to ensure the reliability of the data stored in the memory devices 240. To reduce a duration to perform the scan operation, the memory system controller 215 may utilize the information otherwise used for garbage collection operations—e.g., validity information regarding the data stored in the memory devices 240. By utilizing the validity information, the memory system controller 215 may refrain from scanning portions of the data that are invalid. This may allow the memory system controller 215 to perform the scan operation faster than having to scan all of the data—e.g., invalid and valid data. The memory system controller 215 may improve the overall performance of the system 200 by utilizing the validity information.

Figure 3:
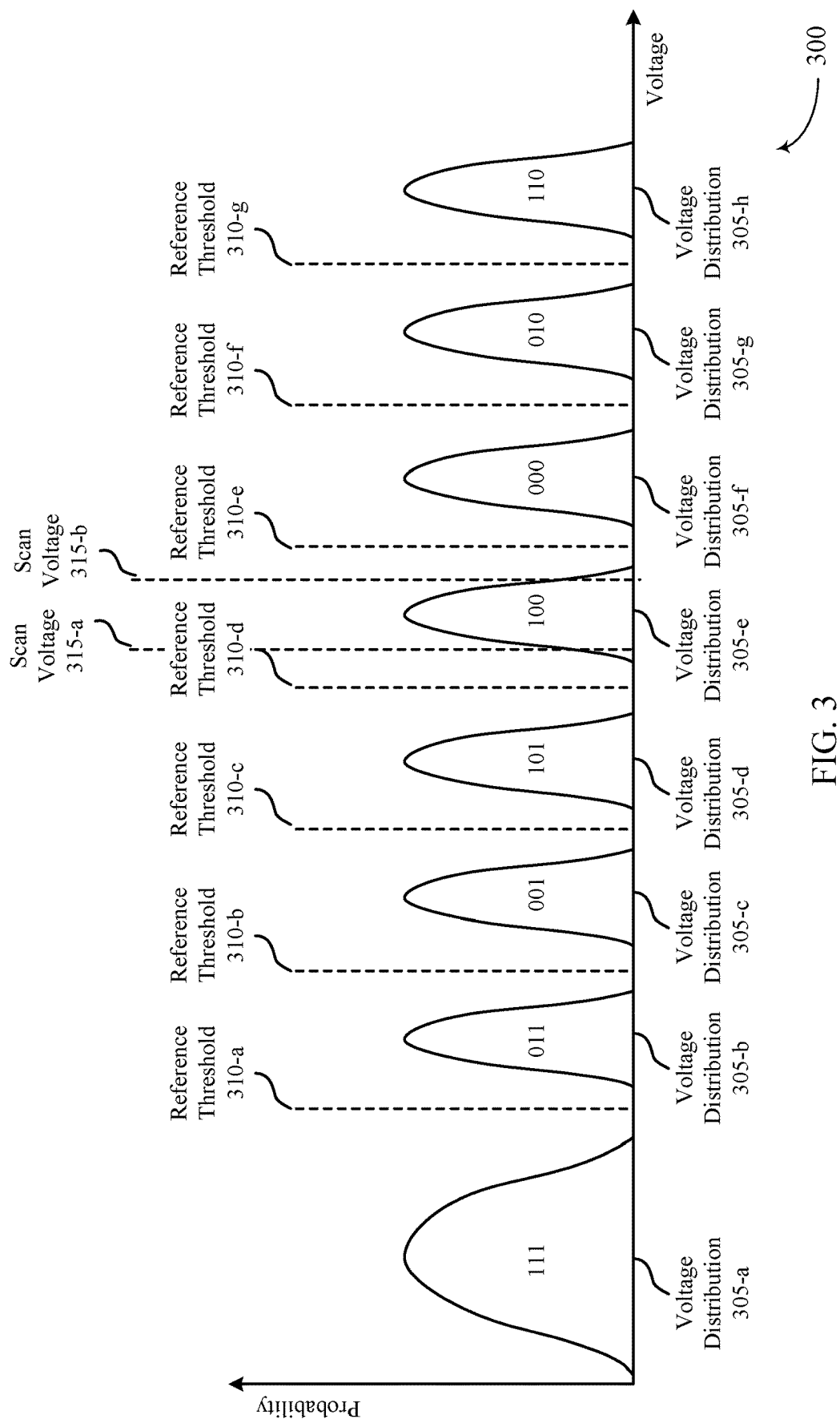
FIG. 3 illustrates an example of a distribution plot that supports valid data aware media reliability scanning in accordance with examples as disclosed herein.

FIG. 3 illustrates an example of a distribution plot 300 that supports valid data aware media reliability scanning in accordance with examples as disclosed herein. The distribution plot 300 may illustrate an example distribution plot 300 of a TLC as described herein. Although distribution plot 300 illustrates an example distribution plot 300 of a TLC, similar distribution plots 300 may apply for memory cells that store other quantities of bits. For example, an MLC or QLC may be associated with a similar distribution plot 300 with different quantities of voltage distributions 305 (e.g., based on a quantity of bits stored by the memory cell).

The distribution plot 300 may illustrate voltage distributions 305 associated with different logic states of a TLC. For example, the voltage distribution 305-a may illustrate the voltage distribution of cells of a TLC storing the logic value '111.' In another example, voltage distribution 305-d may illustrate the voltage distribution 305-d of cells of a TLC storing the logic value '101.' In some cases, each logic state may correspond to data associated with more than one page of data. For example, each logic value may include data associated with three pages (e.g., a first page, a second page, and a third page). That is, a first bit may be associated with a first page, a second bit may be associated with a second page, and a third bit may be associated with a third page. In other examples, some of the bits associated with each logic value may be from the same page (e.g., a TLC may store logic values associated with two pages, where the TLC stores more than one bit for one of the two pages).

In some other examples, a distribution plot 300 may illustrate voltage distributions 305 of a TLC storing other values than those illustrated by the distribution plot 300. For example, each voltage distribution 305 may correspond to the inverted logic values. That is, voltage distribution 305-a may correspond to a TLC storing the logic value '000.' Additionally, voltage distribution 305-d may illustrate the voltage distribution 305-d of a TLC storing the logic value '010.'

The distribution plot 300 may also illustrate reference thresholds 310. The reference thresholds 310 may be examples of reference thresholds 310 as described with reference to FIG. 2. That is, a memory system (e.g., memory system 110 as described with reference to FIG. 1) may apply one or more reference thresholds 310 to one or more memory cells to determine the logic values stored by the one or more memory cells. For example, the memory system may apply each of the reference thresholds 310 to one or more memory cells to read each page of data stored by the one or more memory cells. In another example, the memory system may apply a subset of the reference thresholds 310 to the one or more memory cells to read a subset of the pages of data stored by the one or more memory cells. For example, the memory system may apply only reference threshold 310-d to determine a value stored by the memory cell associated with a first page. That is, if current flows from the memory cell after applying the reference threshold 310-d to the memory cell, the memory system may determine that the value stored by the memory cell associated with the first page is a logic value '0.' Alternatively, if current does not flow from the memory cell after applying the reference threshold 310-d to the memory cell, the memory system may determine that the value stored by the memory cell associated with the first page is a logic value '1.'

In another example, the memory system may apply three reference thresholds 310 to the memory cell to determine values stored by the memory cell associated with the first page and the second page. For example, the memory system may apply either reference threshold 310-a or reference threshold 310-b; either reference threshold 310-c, reference threshold 310-d, or reference threshold 310-e; and either reference threshold 310-f or reference threshold 310-g.

In some cases, the memory system may determine to apply a subset of the reference thresholds 310 to the memory cell in a case that the memory cell is storing at least one bit of redundant data. For example, the memory system may receive data (e.g., within a write command) to be stored in the memory cell and generate the at least one bit of redundant data for storage in the memory cell based on operating in the first mode associated with a reliability greater than a threshold (e.g., as opposed to the second mode associated with a capacity greater than a threshold). In this example, the memory system may apply the subset of reference thresholds 310 to sense the data included in the write command. In cases that the memory system detects an error within the sensed data, the memory system may apply the remaining reference thresholds 310 to sense the redundant data. Here, the memory system may utilize the redundant data to correct the detected errors.

In some cases, the memory system may perform a scan operation to determine a margin of reliability for a set of data stored in a block (e.g., block 170 as described with reference to FIG. 1) of a memory device (e.g., memory devices 130 as described with reference to FIG. 1). In some examples, the memory system may utilize various scan voltages 315 to perform the scan operation. For example, the memory system may start with a scan voltage 315-a and determine the quantity of cells with lower page (e.g., the LSB) values of '0' that would show up as errors at the scan voltage 315-a.

The memory system may then determine a margin of the cells storing lower page values of '0.' Similarly, the memory system may apply a scan voltage 315-*b* to determine a margin of a different page (e.g., the MSB), for example, the marge of the cells to the reference threshold 310-*e*. The memory system may also apply additional scan voltages 315 to determine additional levels of cell margin to reference thresholds 310. That is, the memory system may perform read operations at various scan voltages 315 that are different from reference thresholds 310. For example, the memory system may sweep through the distribution in increasing incremental voltage levels, or may apply different scan levels above or below one or more or each of reference thresholds 310.

The memory system may also determine the quantity of error bits for each scan voltage 315. For example, the memory system may determine a quantity of error bits that result from applying the scan voltage 315-*a*. The memory system may determine the ideal voltage (e.g., a voltage to program the cells) based on the scan voltage 315 that results in a least quantity of error bits. That is, although the memory cells are programmed "100," each memory cell may have a different threshold voltage due to manufacturing inconsistences—e.g., programming a first cell to "100" may utilize a smaller voltage than programming a second cell to "100." Memory cells that have a threshold voltage closest to the reference threshold may be more likely to flip states based on disturb mechanisms (e.g., temperature change, charge loss, charge gain, etc.). By performing the scan operations at one or more scan voltages 315, the memory system may determine which memory cells are closest to the reference thresholds, and most likely to drift to an adjacent logic value. Accordingly, the memory system may monitor the memory cells closest to the reference thresholds more than memory cells on the outer ranges of the distribution—e.g., the memory system may have smaller incremental increases for the voltage around which most of the bits flip to determine the margin of reliability. The smaller quantity of memory cells closest to the reference thresholds, the more reliable the storage may be—e.g., there may be less memory cells likely to flip and alter logic states. In some examples, the memory system may also correct the errors detected during the scan operation.

Figure 4:
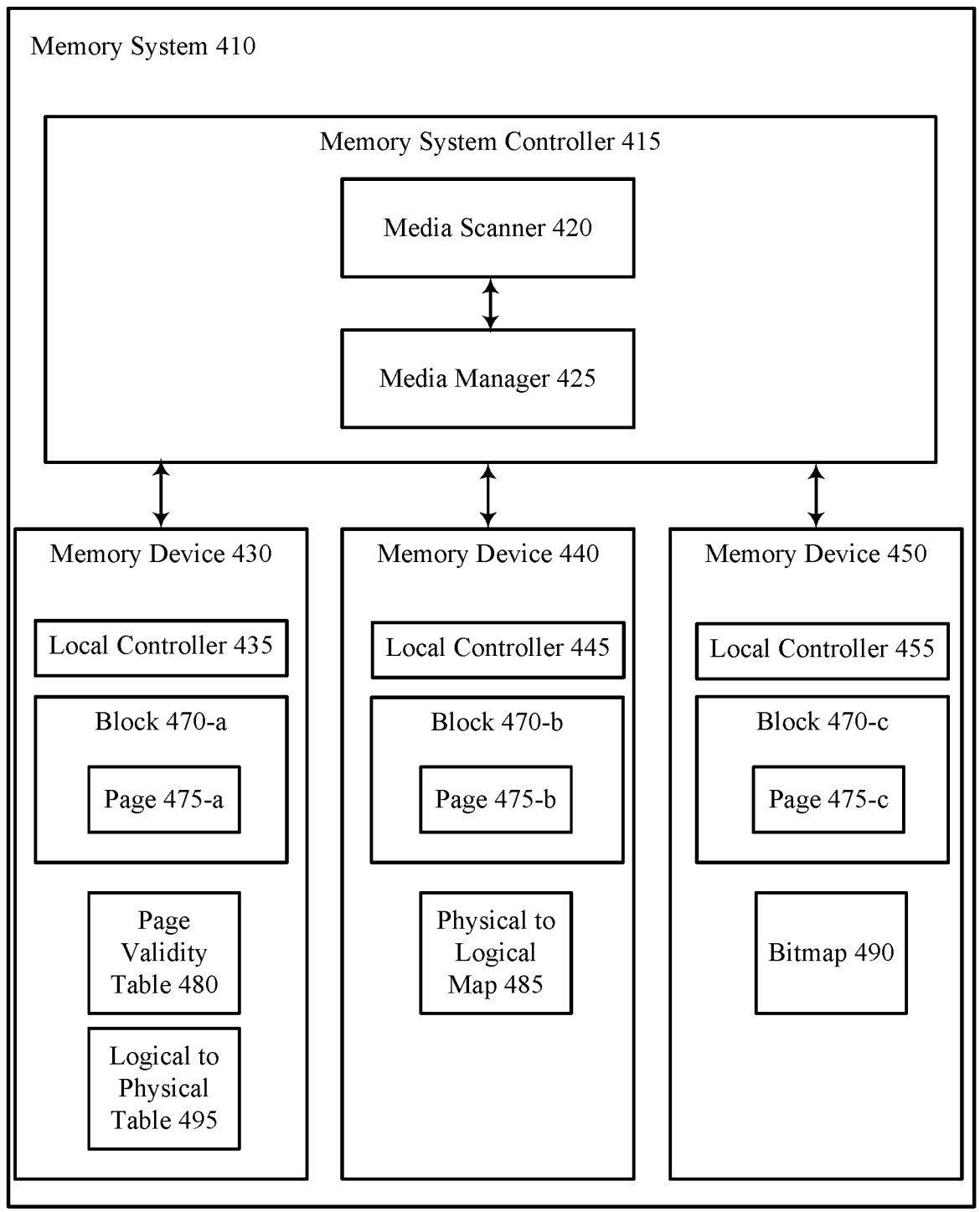
FIG. 4 illustrates an example of a system that supports valid data aware media reliability scanning in accordance with examples as disclosed herein.

FIG. 4 illustrates an example of a system 400 that supports valid data aware media reliability scanning in accordance with examples as disclosed herein. The system 400 may include memory system 410 which may be an example of memory system 110 as described with reference to FIG. 1. The memory system 410 may include a memory system controller 415 and memory device 430, memory device 440, and memory device 450 which may be examples of memory system controller 115 and memory devices 130 as described with reference to FIG. 1. The memory system controller 415 may include media scanner 420 and media manager 425. The memory devices 430, 440, and 450 may include local controllers 435, 445, and 455 and blocks 470-*a*, 470-*b*, and 470-*c*, pages 475-*a*, 475-*b*, 475-*c* respectively, which may be examples of local controller 135, local controller 145, block 170, page 175 as described with reference to FIG. 1. Memory device 430 may store a page validity table 480 and a logical to physical table 495. Memory device 440 may store a physical to logical map 485. Memory device 450 may store a bitmap 490. It should be noted, the logical to physical table 495 is shown stored in memory device 430 for illustrative purposes only. In some examples, the logical to physical table 495 may be stored in memory device 440, memory device 450, or elsewhere in the memory system 410. That is, the memory system 410 may have a single logical to physical table 495 that maintains information relevant to the entire memory system 410. Additionally, the page validity table 480, physical to logical map 485, and bitmap 490 may be stored in any memory device 430, 440, 450, or elsewhere in the memory system 410. That is, the page validity table 480, physical to logical map 485, and bitmap 490 may include information relevant to the entire memory system 415 and are shown in a particular memory device 440 for illustrative purposes only. In some examples, there may also be multiple page validity tables 480, physical to logical maps 485, bitmaps 490 stored in the memory devices 430, 440, 450, or elsewhere in the memory system 410. In some examples, the blocks 470-*a*, 470-*b*, and 470-*c* may also include a plurality of pages 475. That is, a single page 475 is shown in each block 470 for illustrative purposes only. In some examples, a page 475 may also be referred to as a sub-block. Additionally, memory devices 430, 440, and 450 may include a plurality of blocks 470. That is, a single block 470 in each memory device is shown for clarity only and is not limiting on the claims. A block 470 may refer to a level of granularity of storage in the memory device 430, 440, and 450. That is, as described with reference to FIG. 1, the memory device 430, 440, 450 may include one or more planes (e.g., planes 165) that include respective blocks 470. In some examples, concurrent operations may take place across different planes on different blocks 470 (e.g., a concurrent read operation on a first block 470 of each plane). In such examples, a group of blocks 470 configured to perform concurrent operations across the planes may be referred to as a virtual block. Each block 470 may include memory cells organized in rows and columns where memory cells in the same page 475 may share common word lines.

As described with reference to FIG. 1, memory system 410 may be configured to store data for a host system (e.g., host system 105 as described with reference to FIG. 1). The memory system 410 may also be configured to execute commands (e.g., read commands, write commands) received from the host system. In some examples, the memory system 410 may communicate data or a response after executing the command received from the host system.

Memory system controller 415 may be configured to communicate with the host system. For example, the memory system controller 415 may be configured to receive commands from the host system and communicate the commands to the memory devices 430, 440, and 450. In some examples, the memory system controller 415 may translate a logical memory address received from the host system to a physical memory address associated with a physical location of data in the memory devices 430, 440, and 450. For example, the memory system controller 415 may store a logical to physical table 495 to keep track of the logical addresses received from the host system and the current physical addresses of the data associated with the given logical address. In such examples, the memory system controller 415 may fetch a portion of the logical to physical table 495 relevant to the command received from the host system to perform the translation. In some examples, the memory system controller 415 may include local memory (e.g., SRAM) to store the relevant portions of the logical to physical table 495. For example, the media manager 425 may include local memory (e.g., SRAM) to store a portion of the logical to physical table 495. That is, the media manager 425 may be configured to load (e.g., read) a relevant portion of the logical to physical table 495—e.g., the portion of the logical to physical table 495 that corresponds to a logical address received from the host system. The media manager 425 may then perform the look up (e.g., read the table) in the local memory.

Memory system controller 415 may also include media manager 425. In some examples, media manager 425 may be configured to manage the data stored at the memory devices 430, 440, and 450. For example, media manager 425 may be configured to execute or manage operations such as wear-leveling operations, garbage collection operations, error control operations such as error-detecting operations or error-correcting operations, encryption operations, caching operations, background refresh, and health monitoring. For example, media manager 425 may be configured to manage operations related to valid and invalid data (e.g., data that is outdated due to a more recent or updated version of the data being stored elsewhere) stored at the memory devices 430, 440, and 450. In such examples, the media manager 425 may be configured to perform garbage collection operations—e.g., media management operations that include selecting a block 470 that has valid and invalid data, copying valid data from a selected page 475 in the block 470 to a new location (e.g., a different block 470), marking the data in the selected page 475 as invalid, and erasing the selected block 470. In some examples, the media manager 425 may be configured to keep track of valid or invalid data through several different techniques. For illustrative purposes only, examples of techniques the media manager 425 may utilize for garbage collection or media management operations are described herein. There may be other techniques the media manager 425 utilizes and the examples given herein are not limiting on the independent claims. Media manager 425 may also use a combination of these techniques for garbage collection or media management operations.

In some examples, the media manager 425 may utilize a page validity table 480 to keep track of valid and invalid data. In such examples, the media manager 425 may, for each block 470, maintain the page validity table 480 that identifies where valid data is stored in the block 470. In some examples, the size of the page validity table 480 may correspond to a size of a host logical block address (LBA). For example, if the host LBA is 4096 bytes and the block 470 may store 4096 LBAs, then the page validity table 480 may store 4096 bits—e.g., each bit in the page validity table 480 may indicate whether a physical location in the memory device 430 associated with a given LBA stores valid or invalid data. In some examples, the page validity table 480 may store a value of one (1) if a corresponding location stores a valid data and a value of zero (0) if the corresponding location stores invalid data. For example, page 475-a may store data corresponding to a first LBA. When the data is first written to page 475-a, the media management may store a value one (1) in the page validity table 480 to indicate the data stored in page 475-a is valid. In some examples, the data corresponding to the first LBA may become invalidated (e.g., the data may be rewritten elsewhere). In such examples, the media manager 425 may clear the value of one (1) and store a value of zero (0) instead to indicate the data in page 475-a is invalid.

In other examples, the media manager 425 may utilize a physical to logical (P2L) map 485 to keep track of valid and invalid data. In such examples, the media manager 425 may maintain a physical to logical mapping for each block 470 in memory device 440. For example, the physical to logical map 485 may include an entry for each physical address in the block 470 that stores an LBA. That is, the physical to logical map 485 may include a list of LBAs that are written to the block 470-b—e.g., the physical to logical map 485 may indicate a first LBA is written to page 475-b. In some examples, the physical to logical map 485 may not be updated—e.g., the physical to logical map 485 may be written to when the data is initially stored and then remain unchanged (e.g., until the block 470-b is erased). In such examples, the media manager 425 may first read the physical to logical map 485 for a given location (e.g., a physical location in page 475-b). For each LBA stored in page 475-b (e.g., in some examples the page 475-b may store four (4) LBAs), the media manager 425 may perform a lookup against the logical to physical table 495. For example, the media manager 425 may read the physical to logical map 485 to determine a first LBA was initially stored in the page 475-b. The media manager 425 may then look up a physical address associated with the first LBA in the logical to physical table 495 to determine a current location of the data associated with the first LBA. If the media manager 425 determines the current location is page 475-b, then the data may be valid. If the media management determines current location is somewhere other than page 475-b, the data may be invalid.

In some cases, the media manager 425 may utilize a bitmap 490 to keep track of valid and invalid data. In such examples, the media manager 425 may break up the logical to physical table 495 into several different regions and have a bitmap 490 in memory device 450 that identify which regions of the logical to physical table 495 have data stored in block 470—e.g., bitmap 490 may identify which region of the logical to physical table 495 indicates block 470-c. For example, the bitmap 490 may include a plurality of bits, each bit of the plurality of bits may indicate whether a region of the logical to physical table 495 comprises at least one mapping between a logical address and a physical address within the block 470-c. The media manager 425 may determine whether valid or invalid data is written to block 470-c by then looking up the region identified in bitmap 490. For example, the bitmap 490 may indicate that a first region of the logical to physical table 495 is associated with data stored in page 475. The media manager 425 may then look up the first region (e.g., load the first region) of the logical to physical table 495 to determine validity of the data stored in page 475-c—e.g., if the physical location in the logical to physical table 495 is still in page 475-c, the data may be valid and if the physical location in the logical to physical table 495 indicates a location other than page 475-c, the data may be invalid. In some examples, the quantity of regions the logical to physical table 495 is broken up into may vary. For example, if the logical to physical table 495 has 1,048,576 entries, then the logical to physical table 495 may be broken up into 1024 regions each having 1024 entries. In other examples, the logical to physical table 495 may be broken up into a different quantity of regions based on the storage capacity of the memory device 450.

In some examples, media scanner 420 may be configured to scan the data stored in the memory devices 430, 440, and 450 to ensure reliability. That is, data written to blocks 470 may be altered due to time, temperature changes, charge loss, charge gain, and other disturbance mechanisms. Additionally, memory devices 430, 440, and 450 may become smaller and smaller overtime to meet market expectations. This may cause additional pressure on intrinsic data storage reliability. Accordingly, the media scanner 420 may be configured to select a block 470 to check the reliability of the data stored. In some examples, the media scanner 420 may be configured to randomly select a block 470 to perform a scan operation. In other examples, media scanner 420 may utilize a sequential order of blocks 470 or be programmed to select blocks 470 that are known to cause issues—e.g., blocks 470 that include word lines susceptible to issues based on manufacturing. As described with reference to FIG. 3, the media scanner 420 may scan the block using various scan voltages to determine the quantity of errors in the data stored at blocks 470. In some examples, the media scanner 420 may perform the scan operation as a background operation—e.g., the host system may also communicate commands the memory system 410 and the memory system controller 415 may communicate data associated with the commands while also performing a scanning operation. That is, the host traffic may compete with the traffic from the scan operations and slow down the overall performance of the memory system 410.

As described herein, the media scanner 420 may be configured to perform scan operation utilizing the information related to the validity of data stored in blocks 470. That is, the media scanner 420 may utilize the information kept by media manager 425. For example, the media scanner 420 may gather information from the page validity table 480, or physical to logical map 485, or the bitmap 490 to determine if a given block 470 stores invalid data—e.g., the media scanner 420 may communicate with the media manager 425 to obtain the validity information associated with a selected block 470. For example, the media scanner 420 may first select a block 470 for scanning. In some cases, when implementing the page validity table 480 technique, the media scanner 420 may request the media manager 425 to read a bit from the page validity table 480 indicating whether the data stored in the selected block 470 is valid—e.g., a value one (1) indicating that the data is valid or a value zero (0) indicating the data is invalid. In such examples, the media manager 425 may then communicate to the media scanner 420 the data is valid if a bit having a value one (1) is read or invalid if a bit having a value zero (0) is read. In other cases, when implementing the physical to logical map 485 technique, the media scanner 420 may request the media manager 420 to read a logical address (e.g., LBA) associated with a physical address of where the data was stored in the selected block 470 from the physical to logical map 485. In such examples, the media manager 425 may then lookup the logical address (e.g., read the logical address) in the logical to physical table 495 to determine a current location of the data (e.g., the valid location of the data). The media manager 425 may then communicate to the media scanner 420 the data is valid if the current location is the same as the selected block 470 or the data is invalid if the current location is different than the selected block 470. In other cases, when implementing the bitmap 490 technique, the media scanner 420 may request the media manager 425 to read a bit indicating which region of the logical to physical table 495 contains a status of validity for the data in the selected block 470. In such examples, the media manager 425 may then look up the logical to physical table 495 region indicated by the bit read and communicate to the media scanner 420 that the data is valid if a physical address located in the logical to physical table 495 is located in the selected block 470 or that the data is invalid if a physical address located in the logical to physical table 495 is located in a block 470 other than the selected block 470. Accordingly, media scanner 420 may refrain from scanning the invalid data and decrease a duration to perform the scan operation based on receiving the validity information from the media manager 425. This may also reduce the traffic communicated between the memory system controller 415 and the memory devices 430, 440, and 450 during the scan operation. In such examples, the host traffic may compete less with the traffic from the media scan and boost the overall performance of the memory system 410.

Figure 5:
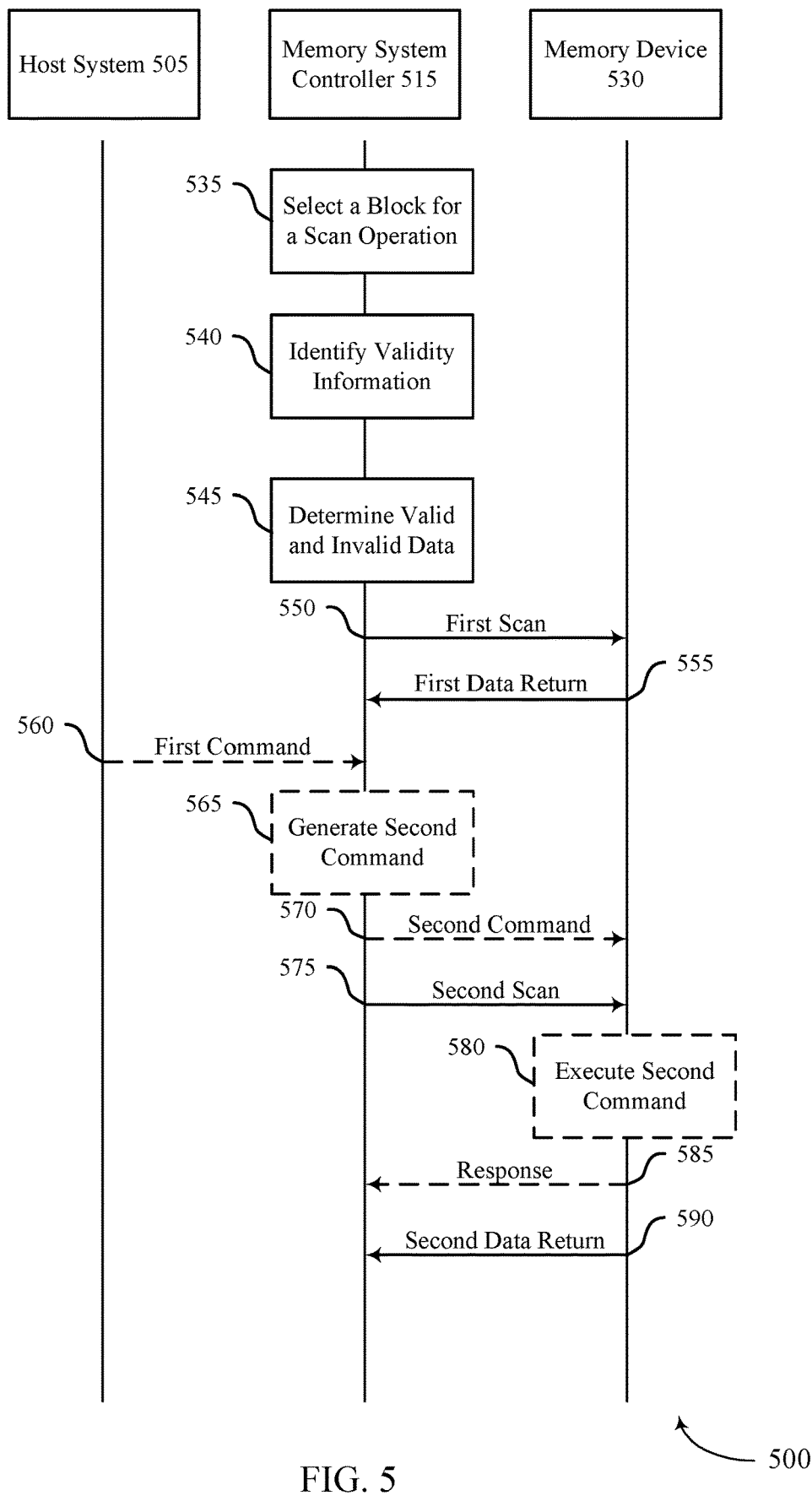
FIG. 5 illustrates an example of a process flow that supports valid data aware media reliability scanning in accordance with examples as disclosed herein.

FIG. 5 illustrates an example of a process flow 500 that supports valid data aware media reliability scanning in accordance with examples as disclosed herein. The process flow 500 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the process flow 500 may be performed by a system (e.g., system 100) as described with reference to FIG. 1. For example, the process flow 500 may be performed by a host system 505 (e.g., host system 105 as described with reference to FIG. 1), a memory system controller 515 (e.g., memory system 110 as described with reference to FIG. 1), and a memory device 530 (e.g., memory devices 130 as described with reference to FIG. 1). In some examples, the operations of the memory system controller 515 may be performed by a media scan (e.g., media scanner 420 as described with reference to FIG. 4) and media management (e.g., media manager 425 as described with reference to FIG. 4). In some examples, a memory system controller 515 may execute a set of codes to control the functional elements of the memory system to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible. FIG. 5 may illustrate the system 100 communicating commands and responses between the host system 505, the memory system controller 515, and memory device 530 during a scan operation.

At 535, a block is selected for a scan operation. For example, a block (e.g., block 470 as described with reference to FIG. 4) may be selected by a memory system controller 515. In some examples, the block may be selected by a media scan (e.g., media scanner 420 as described with reference to FIG. 4). For example, the memory system controller 515 may perform periodic media scans (e.g., scanning one block per time period, scanning each block within a time period on average) to ensure the reliability of data stored in the memory device 530. When performing a media scan, the memory system controller 515 may select a block to perform the scan operation. In some examples, the memory system controller 515 may select a random block of memory device 530. In other examples, the memory system controller 515 may select a block based on a sequential order. In other cases, the memory system controller 515 may select a block based on programmed instructions. For example, the memory system controller 515 may be programed to select a block that includes a troublesome word line—e.g., a word line susceptible to errors based on a manufacturing process.

At 540, validity information may be identified. For example, the memory system controller 515 may identify validity information associated with the block selected at 535. As described with reference to FIG. 4, the memory system controller 515 may include media management (e.g., media manager 425) that keeps track of valid and invalid data for media management operations—e.g., garbage collection operations. As described herein, the memory system controller 515 may utilize the information kept for media management operations to perform more efficient scans—e.g., by avoiding performing scan operations on invalid data. The memory system controller 515 may identify the validity information through various techniques. For example, as described with reference to FIG. 4, the memory system controller 515 may utilize a page validity table (e.g., page validity table 480), a physical to logical map (e.g., physical to logical map 485) or a logical to physical bitmap (e.g., bitmap 490) to keep track of a status of validity associated with data stored in the memory device 530. That is, memory system controller 515 may identify where the relevant validity information is stored in the memory device 530—e.g., in a page validity table, in a physical to logical map, or in bit map.

In some examples, the memory system controller 515 may read a portion of the logical to physical address table (e.g., logical to physical table 495) associated with the block selected. The memory system controller 515 may also read the relevant portions of the page validity table, the physical to logical map, or the bit map to obtain the information regarding the validity of the data stored in the selected block. For example, when implementing the page validity table technique, the memory system controller 515 may read a bit indicating whether the data stored in the selected block is valid—e.g., a value one (1) indicating that the data is valid or a value zero (0) indicating the data is invalid. In other examples, when implementing the logical to physical map, the memory system controller 515 may read a logical address (e.g., LBA) associated with a physical address of where the data was stored in the selected block. In other cases, when implementing the logical to physical bitmap, the memory system controller 515 may read a bit indicating which region of the logical to physical table to look-up. In such examples, the memory system controller 515 may also request that portion of the logical to physical table and receive that from the memory device 530.

At 545, valid and invalid data may be determined. For example, the memory system controller 515 may determine whether the selected block stores valid or invalid data (or a combination or both). In some examples, when implementing the page validity table technique, the memory system controller 515 controller may determine whether data stored in the selected block is valid or invalid based on whether a one (1) or a zero (0) is received. In other examples, when implementing the logical to physical map, the memory system controller 515 may look up the logical address received to in the logical to physical table to determine a current location of the data (e.g., the valid location of the data). If the current location is the selected block, then the memory system controller 515 may determine the data is valid. If the current location is different than the selected block, then the memory system controller 515 may determine the data is invalid. In other cases, when implementing the logical to physical bitmap, the memory system controller 515 may load the region of the logical to physical table indicated by the logical to physical bitmap received from the memory device 530. The memory system controller 515 may then determine the data is valid if the physical address located in the logical to physical table is within the selected block and determine the data is invalid if the physical address is located outside the selected block.

At 550, a first scan may be performed. For example, the memory system controller 515 may perform a first scan operation on the selected block of memory device 530. As described with reference to FIG. 3, the scan operation may determine a margin of reliability for the data stored in the selected block. Accordingly, the memory system controller 515 may apply a plurality of voltages to the selected block to determine margin of reliability. In the first scan, the memory system controller 515 may apply a first voltage to the selected block. Additionally, as the memory system controller 515 determined which areas of the selected block include invalid data, the memory system controller 515 may refrain from scanning the invalid data. This may decrease a duration to perform the scan.

At 555, first data may be received. For example, the memory system controller 515 may receive first data from the memory device 530 after performing the first scan operation. The memory system controller 515 may utilize the first data return to determine if there any errors in the data stored—e.g., based on error correction coding. That is, the memory system controller 515 may determine a quantity of errors in the data stored utilizing error correction coding. The memory system controller 515 may utilize the first data return to also determine an initial margin of reliability of data stored in the selected block.

At 560, a first command may be received. For example, the memory system controller 515 may receive a first command from a host system 505. In some examples, the first command may be an access command (e.g., read, write, or refresh command). In some cases, the memory system controller 515 may perform the scan operation as a background operation. That is, the host system 505 may be unaware the memory system controller 515 is performing a scan operation. Accordingly, the host system 505 may in some cases, transmit a first command while the memory system controller 515 is performing the scan operation. This may cause host traffic to compete with the traffic generated from the scan operation as described herein. By decreasing the duration to perform the scan operation (e.g., by refraining from scanning the invalid data), the overall performance of the system may increase and there may be less traffic from the scan operation competing with the host traffic.

At 565, a second command may be generated. For example, the memory system controller 515 may generate a second command to transmit to the memory device 530. In some examples, the memory system controller 515 may perform address translations, data buffering, and other functions on the first command to generate a second command for memory device 530. In some cases, the memory system controller 515 may request a portion of the logical to physical table relevant to the command, increasing the traffic and bandwidth of the system as a whole.

At 570, a second command may be transmitted. For example, the memory system controller 515 may transmit the second command to the memory device 530.

At 575, a second scan may be performed. For example, the memory system controller 515 may perform a second scan operation on the selected block of memory device 530. In the second scan, the memory system controller 515 may apply a second voltage to the selected block. Additionally, as the memory system controller 515 determined which areas of the selected block include invalid data, the memory system controller 515 may refrain from scanning the invalid data.

At 580, the second command may be executed. For example, the memory device 530 may execute the second command. In some examples, the second command may be executed by a local controller (e.g., local controller 135 as described with reference to FIG. 1). In some cases, the memory device 530 may write data to or read data from a plurality of blocks in the memory device. In some examples, the memory system controller 515 may also concurrently be performing the second scan. Accordingly, the host traffic may be competing with the traffic from the second scan. By decreasing the duration to perform the second scan (e.g., by refraining from scanning invalid data), there may be less traffic from the scan operation. That is, by performing a scan operation as described herein, the host traffic competition with the scan operation traffic may be alleviated or somewhat mitigated.

At 585, a response is received. For example, the memory system controller 515 may receive a response from the memory device 530. The memory device 530 may transmit a response based on executing the second command at 580. For example, the response may include data or an indication that data was stored in the memory device 530.

At 590, second data may be received. For example, the memory system controller 515 may receive second data from the memory device 530 after performing the second scan. The memory system controller 515 may utilize the second data return to determine if there any errors in the data stored—e.g., e.g., based on error correction coding. The memory system controller 515 may utilize the second data return to also determine an additional margin of reliability of data stored in the selected block. That is, as the second scan utilized a second voltage, the memory system controller 515 may utilize the second data return to determine additional information about the margin of reliability. In some examples, after receiving the second data, the memory system controller 515 may perform additional scans to determine a better margin of reliability. In other examples, after receiving the second data, the memory system controller 515 may correct the errors detected—e.g., the memory system controller 515 may rewrite the data stored in the selected block to a new block based on determining errors in the selected block. In some examples, steps 585 and 590 may be performed concurrently. That is, the memory system controller may be receiving both the second data from the second scan and the response from the second command. In such examples, the host system 505 traffic and scan traffic may compete. By utilizing the validity information, the memory system controller 515 may perform the scan operation more efficiently and reduce the bandwidth and decrease the amount of scan traffic competing with the host system 505.

Figure 6:
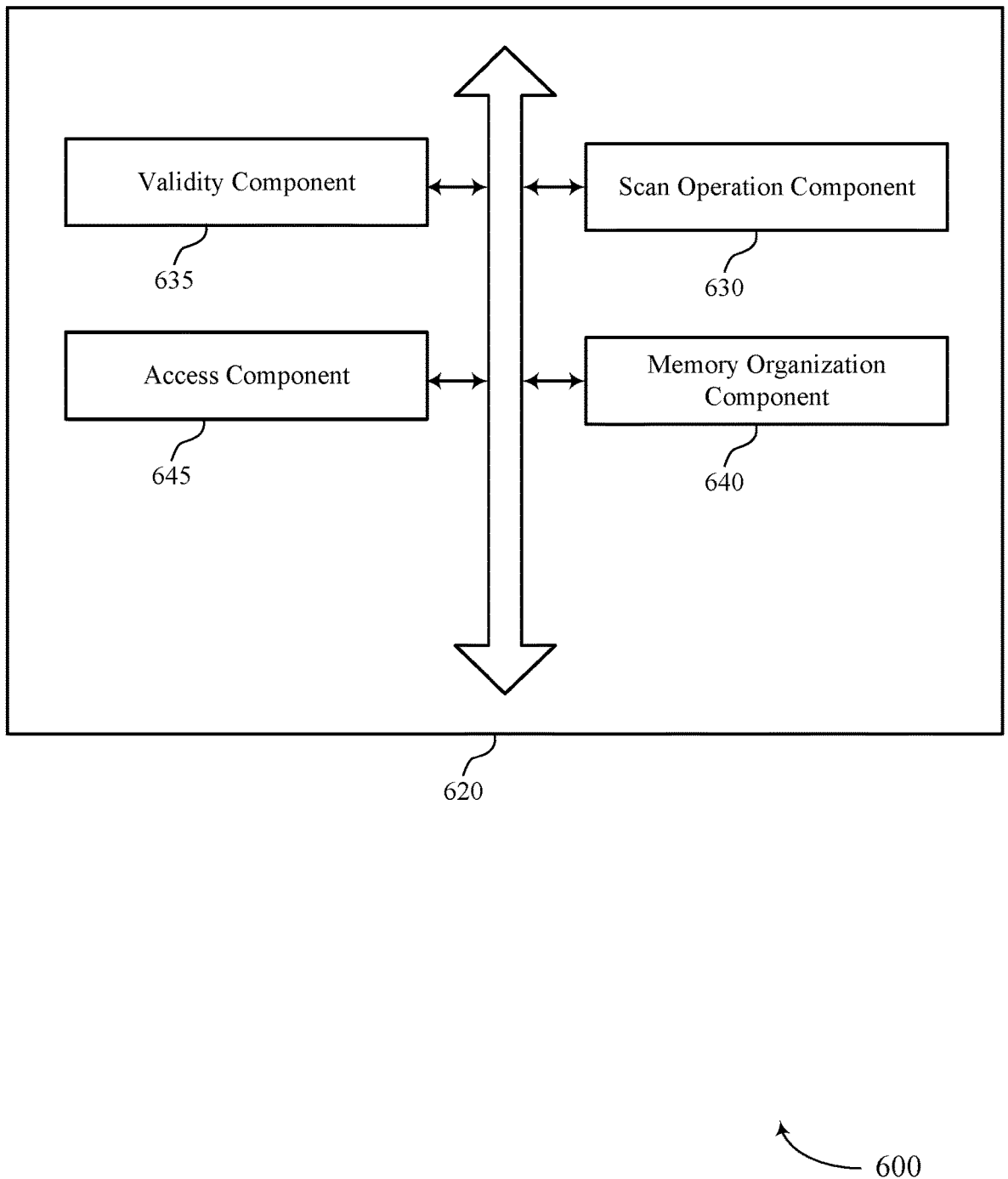
FIG. 6 shows a block diagram of a memory system controller that supports valid data aware media reliability scanning in accordance with examples as disclosed herein.

FIG. 6 shows a block diagram 600 of a memory system controller 620 that supports valid data aware media reliability scanning in accordance with examples as disclosed herein. The memory system controller 620 may be an example of aspects of a memory system controller as described with reference to FIGS. 1 through 5. The memory system controller 620, or various components thereof, may be an example of means for performing various aspects of valid data aware media reliability scanning as described herein. For example, the memory system controller 620 may include a scan operation component 630, a validity component 635, a memory organization component 640, an access component 645, or any combination thereof. Each of these components may communicate, directly or indirectly, with one another (e.g., via one or more buses).

The scan operation component 630 may be configured as or otherwise support a means for selecting a block of a plurality of blocks in a memory array for a scan operation to determine a margin of reliability for a first set of data stored in the block of the plurality of blocks. In some examples, the scan operation component 630 may select the block of the plurality of blocks based at least in part on a randomization technique. In some cases, the scan operation component 630 may select the block of the plurality of blocks based at least in part on a sequential order.

In some instances, the scan operation component 630 may be configured as or otherwise support a means for performing the scan operation on the first subset of the sub-blocks and not on the second subset of the sub-blocks in the block of the plurality of blocks based at least in part on determining the first subset of the sub-blocks.

The validity component 635 may be configured as or otherwise support a means for identifying information associated with a status of a validity of sub-blocks of the first set of data in the block based at least in part on selecting the block. In some examples, the validity component 635 may be configured as or otherwise support a means for determining a first subset of the sub-blocks storing valid data of the first set of data and a second subset of the sub-blocks that are invalid based at least in part on identifying the information.

In some instances, the validity component 635 may be configured as or otherwise support a means for identifying a table storing a plurality of bits associated with the status of the validity of sub-blocks. In some cases, the validity component 635 may be configured as or otherwise support a means for identifying a first bit of the plurality of bits associated with a first sub-block of the first subset of the sub-blocks based at least in part on identifying the table. In some instances, the validity component 635 may be configured as or otherwise support a means for identify a second bit of the plurality of bits associated with a second sub-block of the second subset of the sub-blocks based at least in part on identifying the table.

In some examples, the validity component 635 may be configured as or otherwise support a means for determining a first value of the first bit of the plurality of bits indicates that the first subset of the sub-blocks stores valid data, where determining the first subset of the sub-blocks storing valid data is based at least in part on determining the first value of the first bit. In some instances, the validity component 635 may be configured as or otherwise support a means for determining a second value of the second bit of the plurality of bits indicates that the second subset of the sub-block stores invalid data, where determining the second subset of the sub-blocks storing invalid data is based at least in part on determining the second value of the second bit.

In some cases, the validity component 635 may be configured as or otherwise support a means for identifying a first table storing a first logical address associated with a first physical address associated with a first sub-block of the block. In some instances, the validity component 635 may be configured as or otherwise support a means for accessing a second table storing a second physical address associated with the first logical address corresponding to a current location of data associated with the first logical address.

In some cases, the validity component 635 may be configured as or otherwise support a means for determining that the first physical address is within the first subset of the sub-blocks based at least in part on comparing the first physical address with the second physical address.

In some examples, the memory organization component 640 may be configured as or otherwise support a means for performing a memory organization process including moving valid sub-blocks of data within first blocks to second, different blocks based at least in part on a quantity of invalid sub-blocks within the first blocks, where identifying the information associated with the status of the validity of the sub-blocks is based at least in part on performing the memory organization process.

In some instances, the access component 645 may be configured as or otherwise support a means for accessing a first table associated with the block storing a plurality of bits, each bit of the plurality of bits indicating whether a region of a plurality of regions of a second table includes at least one mapping between a logical address and a physical address within the block. In some examples, the access component 645 may be configured as or otherwise support a means for accessing a first region of a second table based at least in part based at least in part on a value of a first bit of the plurality of bits indicates that the first region stores a mapping between the logical address and the corresponding physical address within the block.

In some cases, the validity component 635 may be configured as or otherwise support a means for determining that a sub-block associated with the corresponding physical address is in the first subset of the sub-blocks based at least in part on accessing the first region of the second table.

Figure 7:
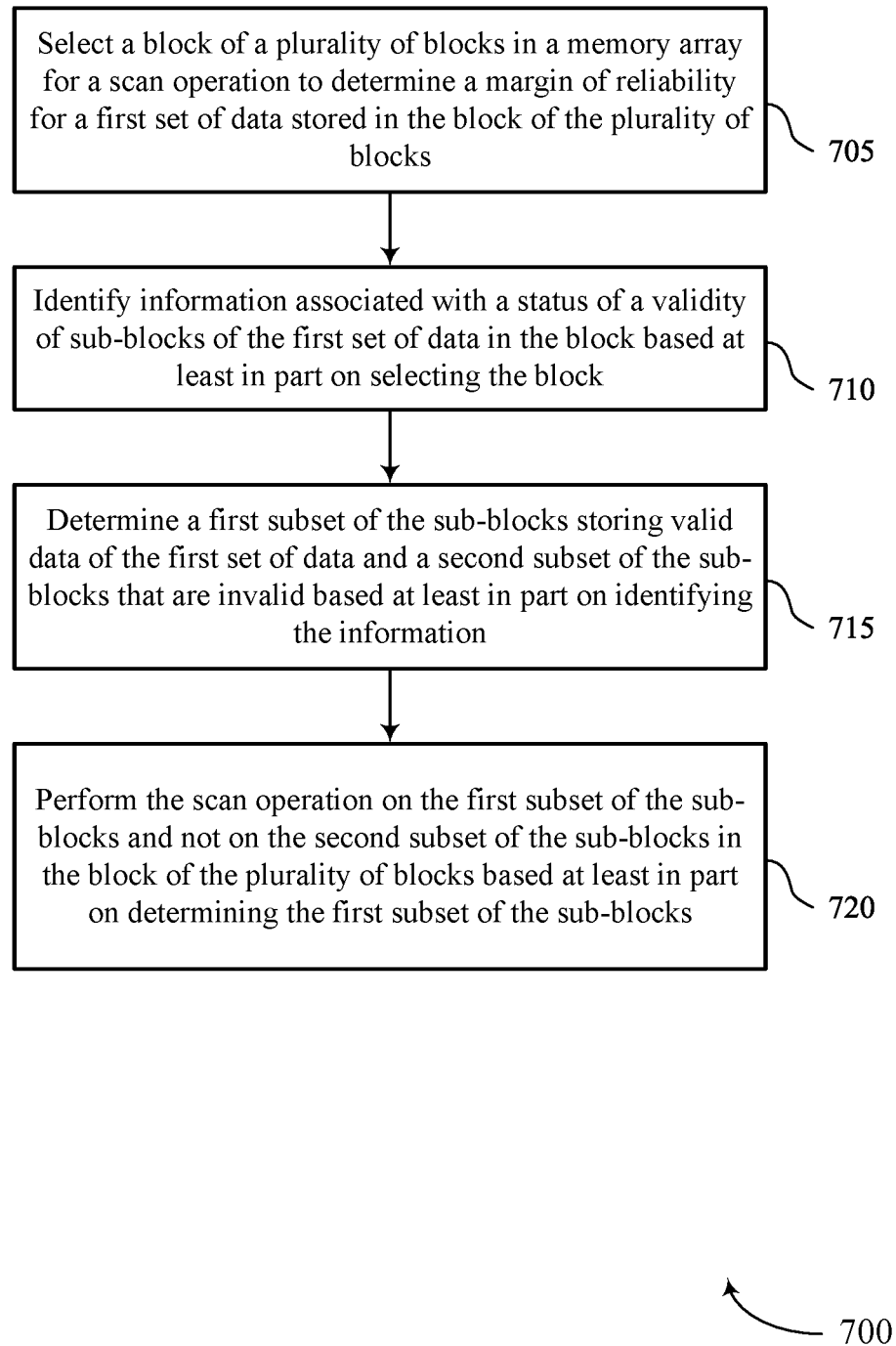
FIG. 7 shows a flowchart illustrating a method or methods that support valid data aware media reliability scanning in accordance with examples as disclosed herein.

FIG. 7 shows a flowchart illustrating a method 700 that supports valid data aware media reliability scanning in accordance with examples as disclosed herein. The operations of method 700 may be implemented by a memory system controller or its components as described herein. For example, the operations of method 700 may be performed by a memory system controller as described with reference to FIGS. 1 through 6. In some examples, a memory system controller may execute a set of instructions to control the functional elements of the device to perform the described functions. Additionally or alternatively, the memory system controller may perform aspects of the described functions using special-purpose hardware.

At 705, the method may include selecting a block of a plurality of blocks in a memory array for a scan operation to determine a margin of reliability for a first set of data stored in the block of the plurality of blocks. The operations of 705 may be performed in accordance with examples as disclosed herein. In some examples, aspects of the operations of 705 may be performed by a scan operation component 630 as described with reference to FIG. 6.

At 710, the method may include identifying information associated with a status of a validity of sub-blocks of the first set of data in the block based at least in part on selecting the block. The operations of 710 may be performed in accordance with examples as disclosed herein. In some examples, aspects of the operations of 710 may be performed by a validity component 635 as described with reference to FIG. 6.

At 715, the method may include determining a first subset of the sub-blocks storing valid data of the first set of data and a second subset of the sub-blocks that are invalid based at least in part on identifying the information. The operations of 715 may be performed in accordance with examples as disclosed herein. In some examples, aspects of the operations of 715 may be performed by a validity component 635 as described with reference to FIG. 6.

At 720, the method may include performing the scan operation on the first subset of the sub-blocks and not on the second subset of the sub-blocks in the block of the plurality of blocks based at least in part on determining the first subset of the sub-blocks. The operations of 720 may be performed in accordance with examples as disclosed herein. In some examples, aspects of the operations of 720 may be performed by a scan operation component 630 as described with reference to FIG. 6.

In some examples, an apparatus as described herein may perform a method or methods, such as the method 700. The apparatus may include, features, circuitry, logic, means, or instructions (e.g., a non-transitory computer-readable medium storing instructions executable by a processor) for selecting a block of a plurality of blocks in a memory array for a scan operation to determine a margin of reliability for a first set of data stored in the block of the plurality of blocks, identifying information associated with a status of a validity of sub-blocks of the first set of data in the block based at least in part on selecting the block, determining a first subset of the sub-blocks storing valid data of the first set of data and a second subset of the sub-blocks that are invalid based at least in part on identifying the information, and performing the scan operation on the first subset of the sub-blocks and not on the second subset of the sub-blocks in the block of the plurality of blocks based at least in part on determining the first subset of the sub-blocks.

Some examples of the method 700 and the apparatus described herein may further include operations, features, circuitry, logic, means, or instructions for performing a memory organization process including moving valid sub-blocks of data within first blocks to second, different blocks based at least in part on a quantity of invalid sub-blocks within the first blocks, where identifying the information associated with the status of the validity of the sub-blocks may be based at least in part on performing the memory organization process.

Some instances of the method 700 and the apparatus described herein may further include operations, features, circuitry, logic, means, or instructions for identifying a table storing a plurality of bits associated with the status of the validity of sub-blocks, identifying a first bit of the plurality of bits associated with a first sub-block of the first subset of the sub-blocks based at least in part on identifying the table, and identify a second bit of the plurality of bits associated with a second sub-block of the second subset of the sub-blocks based at least in part on identifying the table.

Some cases of the method 700 and the apparatus described herein may further include operations, features, circuitry, logic, means, or instructions for determining a first value of the first bit of the plurality of bits indicates that the first subset of the sub-blocks stores valid data, where determining the first subset of the sub-blocks storing valid data may be based at least in part on determining the first value of the first bit and determining a second value of the second bit of the plurality of bits indicates that the second subset of the sub-block stores invalid data, where determining the second subset of the sub-blocks storing invalid data may be based at least in part on determining the second value of the second bit.

Some examples of the method 700 and the apparatus described herein may further include operations, features, circuitry, logic, means, or instructions for identifying a first table storing a first logical address associated with a first physical address associated with a first sub-block of the block and accessing a second table storing a second physical address associated with the first logical address corresponding to a current location of data associated with the first logical address.

Some instances of the method 700 and the apparatus described herein may further include operations, features, circuitry, logic, means, or instructions for determining that the first physical address may be within the first subset of the sub-blocks based at least in part on comparing the first physical address with the second physical address.

Some cases of the method 700 and the apparatus described herein may further include operations, features, circuitry, logic, means, or instructions for accessing a first table associated with the block storing a plurality of bits, each bit of the plurality of bits indicating whether a region of a plurality of regions of a second table includes at least one mapping between a logical address and a physical address within the block and accessing a first region of a second table based at least in part based at least in part on a value of a first bit of the plurality of bits indicates that the first region stores a mapping between the logical address and the corresponding physical address within the block.

Some examples of the method 700 and the apparatus described herein may further include operations, features, circuitry, logic, means, or instructions for determining that a sub-block associated with the corresponding physical address may be in the first subset of the sub-blocks based at least in part on accessing the first region of the second table.

In some instances of the method 700 and the apparatus described herein, the block of the plurality of blocks may be selected based at least in part on a randomization technique.

In some cases of the method 700 and the apparatus described herein, the block of the plurality of blocks may be selected based at least in part on a sequential order.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array including a plurality of blocks and a controller coupled with the memory array and configured to select a block of the plurality of blocks for a scan operation to determine a margin of reliability for a first set of data stored in the block of the plurality of blocks, identify information associated with a status of a validity of sub-blocks of the first set of data in the block based at least in part on selecting the block, determine a first subset of the sub-blocks storing valid data of the first set of data and a second subset of the sub-blocks that are invalid based at least in part on identifying the information, and perform the scan operation on the first subset of the sub-blocks and not on the second subset of the sub-blocks in the block of the plurality of blocks based at least in part on determining the first subset of the sub-blocks In some examples, the controller may perform a memory organization process including moving valid sub-blocks of data within first blocks to second, different blocks based at least in part on a quantity of invalid sub-blocks within the first blocks, where the controller may be configured to identify the information associated with the status of the validity of the sub-blocks based at least in part on performing the memory organization process.

In some instances, the controller may identify a table storing a plurality of bits associated with the status of the validity of sub-blocks, identify a first bit of the plurality of bits associated with a first sub-block of the first subset of the sub-blocks based at least in part on identifying the table, and identify a second bit of the plurality of bits associated with a second sub-block of the second subset of the sub-blocks based at least in part on identifying the table.

In some cases, the controller may determine a first value of the first bit of the plurality of bits indicates that the first subset of the sub-block stores valid data, where the controller may be configured to determine the first subset of the sub-blocks storing valid data based at least in part on determining the first value of the first bit and determine a second value of the second bit of the plurality of bits indicates that the second subset of the sub-block stores invalid data, where the controller may be configured to determine the second subset of the sub-blocks storing invalid data based at least in part on determining the second value of the second bit.

In some examples, the controller may identify a first table storing a first logical address associated with a first physical address associated with a first sub-block of the block and access a second table storing a second physical address associated with the first logical address corresponding to a current location of data associated with the first logical address.

In some cases, the controller may determine that the first physical address may be within the first subset of the sub-blocks based at least in part on comparing the first physical address with the second physical address.

In some instances, the controller may access a first table associated with the block storing a plurality of bits, each bit of the plurality of bits indicating whether a region of a plurality of regions of a second table includes at least one mapping between a logical address and a physical address within the block and accessing a first region of a second table based at least in part based at least in part on a value of a first bit of the plurality of bits indicates that the first region stores a mapping between the logical address and the corresponding physical address within the block.

In some examples, the controller may determine that a sub-block associated with the corresponding physical address may be in the first subset of the sub-blocks based at least in part on accessing the first region of the second table.

In some examples of the apparatus, the controller may be configured to select the block of the plurality of blocks based on a randomization technique.

In some examples of the apparatus, the controller may be configured to select the block of the plurality of blocks based on a sequential order.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," "based at least in part on," and "in response to," may be used interchangeably. In some examples, if the terms "if," "when," "based on," "based at least in part on," and "in response to," are used to describe a conditional action or connection between portions of a process, the terms may be interchangeable. In some examples, if used to describe a conditional action or process, the terms "if," "when," "based on," "based at least in part on," and "in response to" may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:
   a scan operation component configured to select a block of a plurality of blocks of the memory device;
   a validity component configured to:
      identify validity information of a set of pages in the block; and
      determine a first subset of the set of pages comprises valid data and a second subset of the set of pages comprises invalid data based at least in part on identifying the validity information; and
   the scan operation component further configured to perform a scan operation on the block, the scan operation performed on the first subset of the set of pages and not on the second subset of the set of pages based at least in part on the determination.

2. The memory device of claim 1, wherein each page of the set of pages correspond to a logic bit of a plurality of logic bits of memory cells of the memory device.

3. The memory device of claim 2, wherein the memory cells are tri-level memory cells.

4. The memory device of claim 2, further comprising:
   a memory controller configured to:
      apply one or more reference thresholds to the memory cells; and
      determine each logic bit of the plurality of logic bits based at least in part on the application.

5. The memory device of claim 4, wherein the one or more reference thresholds comprise three reference thresholds.

6. The memory device of claim 4, further comprising:
   a media scanner configured to:
      determine that a memory cell comprises an error based at least in part on applying at least one reference threshold of the one or more reference thresholds to the memory cell; and
      upon determining the error, sensing at least one bit of redundant data in the memory cell based at least in part on applying a remaining amount of the one or more reference thresholds to the memory cell.

7. The memory device of claim 6, the memory controller further configured to correct the error based at least in part on the at least one bit of redundant data.

8. The memory device of claim 1, wherein the scan operation component is further configured to:
   apply a first scan voltage to a memory cell of the memory device;
   determine a first set of pages of the memory cell associated with a lower page value based at least in part on the applied first scan voltage; and
   determine a first margin of reliability based at least in part on the determined first set of pages associated with the lower page value.

9. The memory device of claim 8, wherein the scan operation component is further configured to:
   apply a second scan voltage to the memory cell of the memory device;
   determine a second set of pages of the memory cell associated with a higher page value based at least in part on the applied second scan voltage; and
   determine a second margin of reliability based at least in part on the determined second set of pages associated with the higher page value.

10. The memory device of claim 9, wherein the second scan voltage is greater in magnitude than the first scan voltage.

11. The memory device of claim 9, wherein the scan operation component is further configured to:
    determine a quantity of error bits for each of the first scan voltage and the second scan voltage.

12. A system, comprising:
    a memory array comprising a plurality of blocks; and
    a controller coupled with the memory array configured to cause the system to:
       select a first block of a plurality of blocks of the memory array;
       identify validity information of a set of pages in the first block;
       determine a first subset of the set of pages comprises valid data and a second subset of the set of pages comprises invalid data based at least in part on identifying the validity information; and
       perform a scan operation on the first block, the scan operation performed on the first subset of the set of pages and not on the second subset of the set of pages based at least in part on the determination.

13. The system of claim 12, wherein the controller is further configured to cause the system to:
    receive a first set of data in response to the scan operation;
    determine a first quantity of errors within the first set of data; and
    determine a first margin of reliability based at least in part on the first quantity of errors.

14. The system of claim 13, wherein the controller is further configured to cause the system to:
    perform a second scan operation on the first block exclusive of the second subset of the set of pages.

15. The system of claim 14, wherein the controller is further configured to cause the system to:

receive an access command, wherein the access command is received prior to performing the second scan operation; and execute the access command, wherein the access command is executed concurrently while the second scan operation is being performed.

16. The system of claim 14, wherein the controller is further configured to cause the system to:

receive a second set of data in response to the second scan operation;

determine a second quantity of errors within the first block exclusive of the second subset of the set of pages; and determine a second margin of reliability based at least in part on the first block exclusive of the second subset of the set of pages.

17. The system of claim 16, wherein the controller is further configured to cause the system to:

rewrite data stored in the first block to a second block of the plurality of blocks based at least in part on the first quantity of errors and the second quantity of errors.

18. A device, comprising:

a memory region associated with a plurality of blocks; and circuitry coupled with the memory region and operable to:

select a block of a plurality of blocks of the device;

identify validity information of a set of pages in the block;

determine a first subset of the set of pages comprises valid data and a second subset of the set of pages comprises invalid data based at least in part on identifying the validity information; and perform a scan operation on the block, the scan operation performed on the first subset of the set of pages and not on the second subset of the set of pages based at least in part on the determination.

19. The device of claim 18, wherein the block is selected from preselected blocks.

20. The device of claim 18, wherein the scan operation is performed with a plurality of scan voltages.

* * * * *